(12) United States Patent
Harada et al.

(10) Patent No.: US 10,305,719 B2
(45) Date of Patent: May 28, 2019

(54) RADIO BASE STATION, USER TERMINAL AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 11 days.

(21) Appl. No.: 15/543,586

(22) PCT Filed: Jan. 20, 2016

(86) PCT No.: PCT/JP2016/051579
§ 371 (c)(1),
(2) Date: Jul. 14, 2017

(87) PCT Pub. No.: WO2016/117608
PCT Pub. Date: Jul. 28, 2016

(65) Prior Publication Data
US 2017/0373914 A1 Dec. 28, 2017

(30) Foreign Application Priority Data

Jan. 21, 2015 (JP) ................................. 2015-009815
Apr. 28, 2015 (JP) ................................. 2015-092110

(51) Int. Cl.
*H04B 7/00* (2006.01)
*H04L 29/06* (2006.01)
(Continued)

(52) U.S. Cl.
CPC .......... *H04L 29/06013* (2013.01); *H04J 1/00* (2013.01); *H04J 1/065* (2013.01);
(Continued)

(58) Field of Classification Search
CPC ................................................ H04L 29/06013
See application file for complete search history.

(56) References Cited

U.S. PATENT DOCUMENTS 5,586,122 A * 12/1996 Suzuki ...................... H04J 4/00
370/347
9,154,962 B2 10/2015 Klatt et al.
(Continued)

FOREIGN PATENT DOCUMENTS

JP 2011-176422 A 9/2011
JP 2012-530433 A 11/2012

OTHER PUBLICATIONS

Office Action issued in corresponding Japanese Patent Application No. 2016-570683, dated Jan. 30, 2018 (5 pages).
(Continued)

*Primary Examiner* — Gerald A Smarth
(74) *Attorney, Agent, or Firm* — Osha Liang LLP

(57) ABSTRACT

The present invention is designed to improve spectral efficiency in a system that runs LTE/LTE-A by using a carrier in which LBT (Listen Before Talk) is configured. One aspect of the present invention provides a radio base station in a radio communication system where the radio base station and a user terminal communicate by using a carrier in which LBT is configured, and this radio base station has a measurement section that executes LBT in a predetermined carrier sensing duration and acquires an LBT result, and a transmission section that transmits a downlink signal based on the LBT result, and the predetermined carrier sensing duration includes a first carrier sensing duration and a second carrier sensing duration, which is shorter than the first carrier sensing duration.

3 Claims, 13 Drawing Sheets

(51) Int. Cl.
*H04J 1/00* (2006.01)
*H04J 11/00* (2006.01)
*H04W 16/14* (2009.01)
*H04W 72/08* (2009.01)
*H04J 1/06* (2006.01)
*H04L 27/00* (2006.01)
*H04W 74/08* (2009.01)

(52) U.S. Cl.
CPC ........... *H04J 11/00* (2013.01); *H04J 11/0069* (2013.01); *H04L 27/0006* (2013.01); *H04W 16/14* (2013.01); *H04W 72/08* (2013.01); *H04W 74/0808* (2013.01); *H04J 11/0023* (2013.01)

(56) References Cited

U.S. PATENT DOCUMENTS

| | | | | |
|---|---|---|---|---|
| 2009/0021353 | A1* | 1/2009 | Nonaka | H04B 5/02 340/10.2 |
| 2013/0070605 | A1* | 3/2013 | Ghosh | H04W 72/082 370/241 |
| 2014/0341207 | A1* | 11/2014 | Bhushan | H04W 28/0289 370/350 |
| 2016/0073344 | A1* | 3/2016 | Vutukuri | H04W 52/0216 370/252 |
| 2016/0142920 | A1* | 5/2016 | Suzuki | H04W 16/14 370/336 |

OTHER PUBLICATIONS

Office Action issued in corresponding Japanese Application No. 2016-570683, dated Oct. 3, 2017 (5 pages).
Ericsson; "Details of Listen-Before-Talk for LAA"; 3GPP TSG RAN WG1 Meeting #79, R1-145193; San Francisco, USA; Nov. 17-21, 2014 (7 pages).
ITL Inc.; "Discussion on Channel Access Mechanism based on LBT for LAA"; 3GPP TSG RAN WG1 Meeting #79, R1-145109; San Francisco, USA; Nov. 17-21, 2014 (6 pages).
International Search Report issued in corresponding application No. PCT/JP2016/051579 dated Mar. 15, 2016 (4 pages).
Witten Opinion of the International Searching Authority issued in corresponding application No. PCT/JP2016/051579 dated Mar. 15, 2016 (4 pages).
NTT DOCOMO, "Views on PHY layer options for LAA DL"; 3GPP TSG RAN WG1 Meeting #79, R1-145107; San Francisco, USA; Nov. 17-21, 2014 (7 pages).
Kang et al., "Uncoordinated Coexistence Mechanisms in 802.16h"; IEEE 802.19-09/0041r0; Jun. 30, 2009 (18 pages).
Intel Corporation, "Discussion on PHY layer options for LAA using LTE"; 3GPP TSG RAN WG1 Meeting #79, R1-144666; San Francisco, USA; Nov. 17-21, 2014 (6 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

* cited by examiner

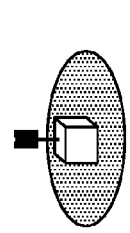
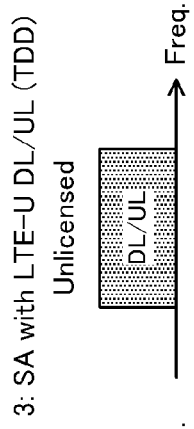
FIG. 1C
FIG. 1B
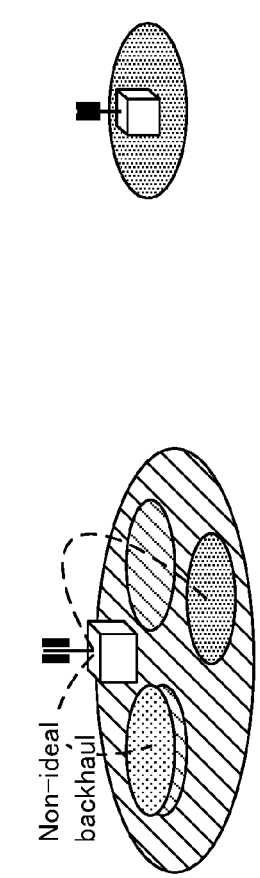
FIG. 1A
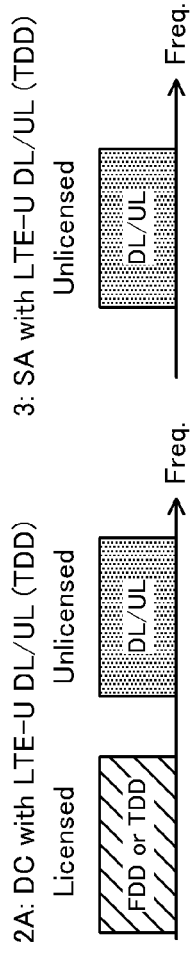
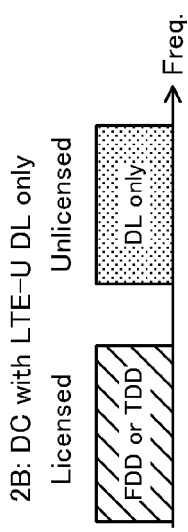
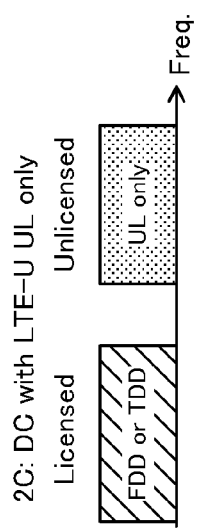
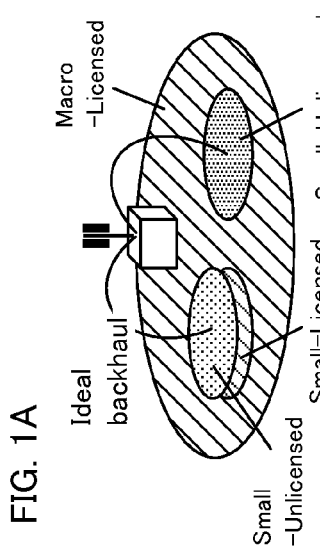
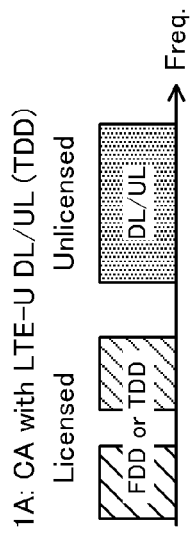
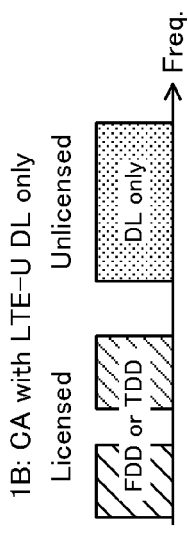
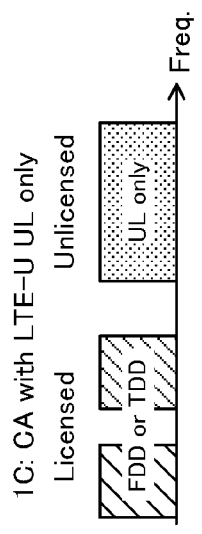

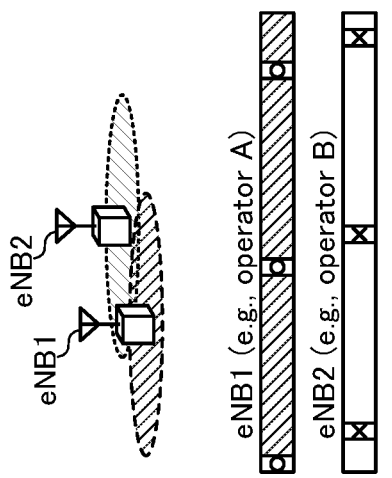
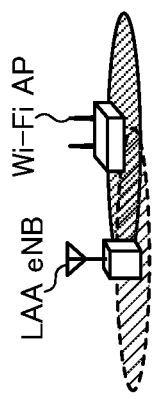
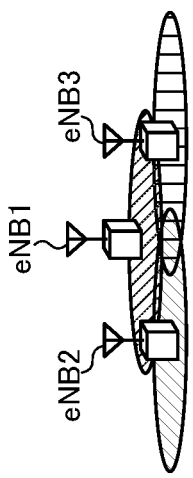
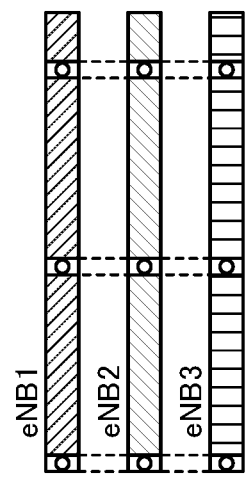
FIG. 3A  FIG. 3B  FIG. 3C

FIG. 4A
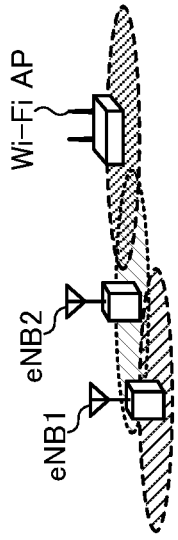
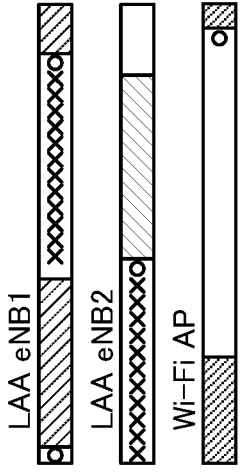
FIG. 4B
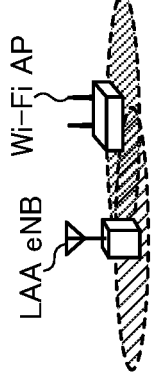
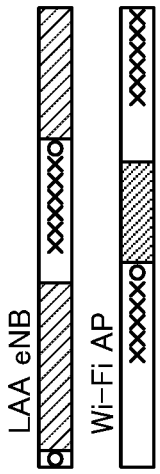
○ : LBT-idle
× : LBT-busy

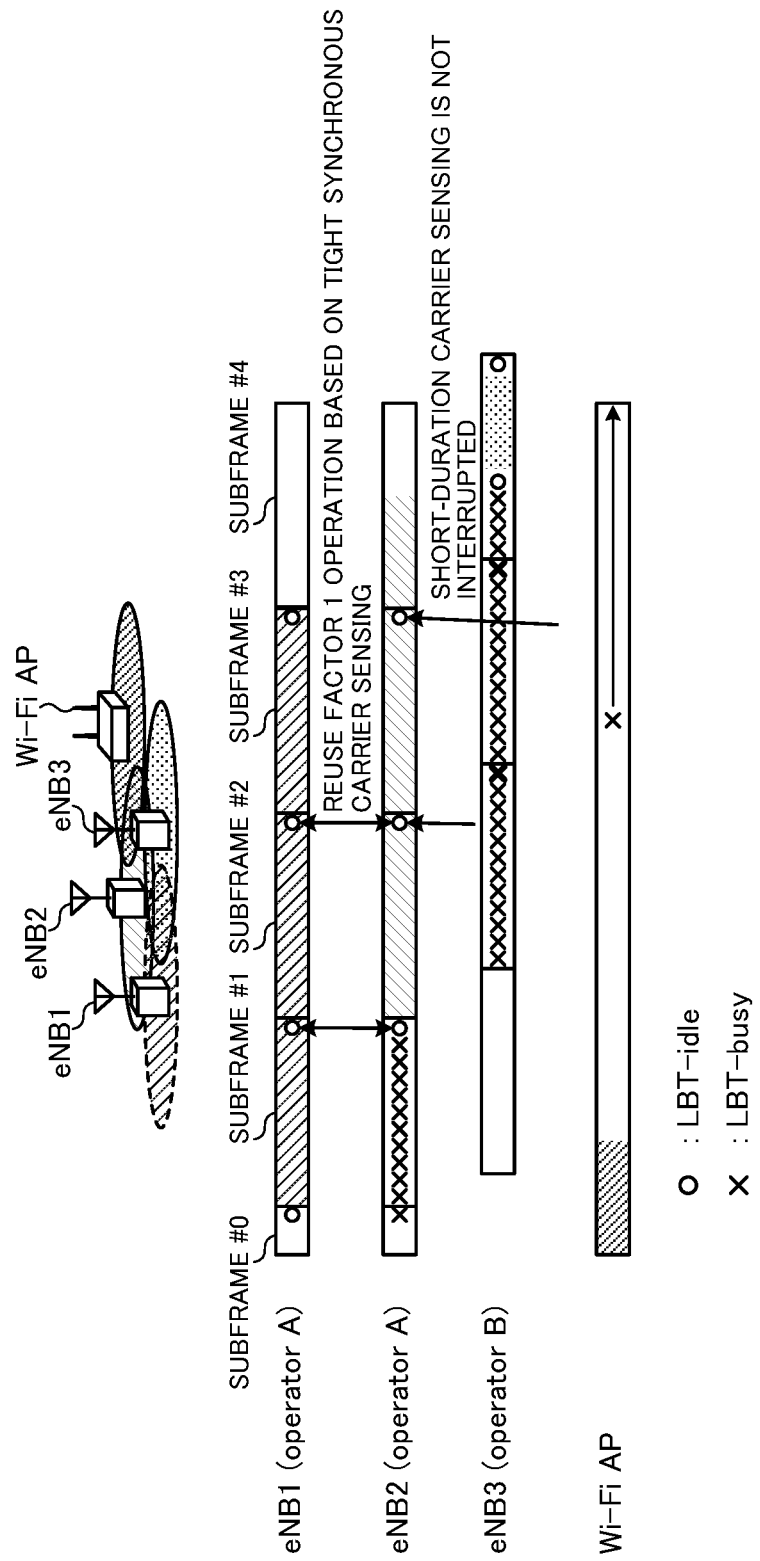

RADIO BASE STATION, USER TERMINAL AND RADIO COMMUNICATION METHOD

TECHNICAL FIELD

The present invention relates to a radio base station, a user terminal and a radio communication method that are applicable to next-generation communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (also referred to as, for example, "LTE-advanced" or "LTE enhancement" (hereinafter referred to as "LTE-A")) have been developed for the purpose of achieving further broadbandization and increased speed beyond LTE.

Furthermore, in relationship to future radio communication systems (Rel. 13 and later versions), a system ("LTE-U" (LTE Unlicensed)) to run an LTE system not only in frequency bands that are licensed to communications providers (operators) (licensed bands), but also in frequency bands that do not require license (unlicensed bands), is under study.

While a licensed band refers to a band in which a specific operator is allowed exclusive use, an unlicensed band (also referred to as a "non-licensed band") refers to a band which is not limited to a specific operator and in which radio stations can be provided. For unlicensed bands, for example, the 2.4 GHz band and the 5 GHz band where Wi-Fi and Bluetooth (registered trademark) can be used, and the 60 GHz band where millimeter-wave radars can be used are under study for use.

In LTE-U operation, a mode that is premised upon coordination with licensed band LTE is referred to as "LAA" (Licensed-Assisted Access) or "LAA-LTE." Note that systems that run LTE/LTE-A in unlicensed bands may be collectively referred to as "LAA," "LTE-U," "U-LTE," and so on.

For unlicensed bands in which LAA is run, a study is in progress to introduce interference control functionality in order to allow co-presence with other operators' LTE, Wi-Fi or different systems. In Wi-Fi, LBT (Listen Before Talk), which is based on CCA (Clear Channel Assessment), is used as an interference control function in the same frequency. In Japan and Europe, the LBT function is stipulated as mandatory in systems such as Wi-FI that is run in the 5 GHz unlicensed band.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

For LTE/LTE-A systems that use carriers in which LBT is configured such as unlicensed bands, FBE (Frame Based Equipment) and LBE (Load Based Equipment) are under study as LBT schemes. In FBE, LBT is executed at regular timings. Also, in LBE, LBT is executed on an as-needed basis.

However, with FBE or LBE, it is difficult to achieve a good balance between efficient and fair co-presence with other systems and efficient frequency operations within the subject system, and this raises the problem that it is difficult to achieve high spectral efficiency in LAA-LTE.

The present invention has been made in view of the above, and it is therefore an object of the present invention to provide a radio base station, a user terminal and a radio communication method that can achieve improved spectral efficiency in a system that runs LTE/LTE-A in a carrier in which LBT is configured.

Solution to Problem

One aspect of the present invention provides a radio base station in a radio communication system where the radio base station and a user terminal communicate by using a carrier in which LBT is configured, and this radio base station has a measurement section that executes LBT in a predetermined carrier sensing duration and acquires an LBT result, and a transmission section that transmits a downlink signal based on the LBT result, and the predetermined carrier sensing duration includes a first carrier sensing duration and a second carrier sensing duration, which is shorter than the first carrier sensing duration.

Advantageous Effects of Invention

According to the present invention, it is possible to achieve improved spectral efficiency in a system that runs LTE/LTE-A in a carrier in which LBT is configured.

BRIEF DESCRIPTION OF DRAWINGS

FIG. 1 provide diagrams to show examples of operation modes in a radio communication system that runs LTE in unlicensed bands;

FIG. 3 provide diagram to explain advantages and disadvantages of FBE;

FIG. 4 provide diagram to explain advantages and disadvantages of LBE;

FIG. 5 is a diagram to show an example of carrier sensing according to a first embodiment;

DESCRIPTION OF EMBODIMENTS

Figure 2A:
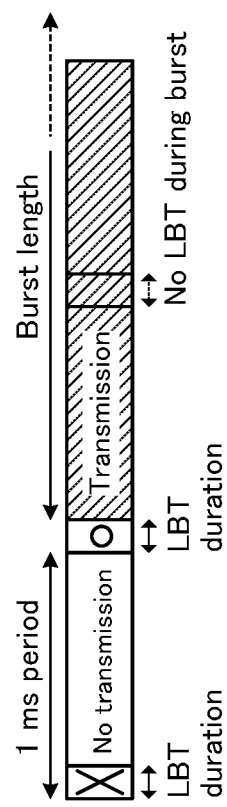
FIG. 2 diagrams to show examples of radio frame configurations in LBT.

FIG. 1 show examples of operation modes in a radio communication system (LTE-U) in which LTE is run in unlicensed bands. As shown in FIG. 1, there may be a plurality of possible scenarios to use LTE in unlicensed bands, such as carrier aggregation (CA), dual connectivity (DC) and stand-alone (SA).

FIG. 1A shows a scenario to employ carrier aggregation (CA) by using licensed bands and unlicensed bands. CA is a technique to bundle a plurality of frequency blocks (also referred to as "component carriers" (CCs), "carriers" "cells," etc.) into a wide band. Each CC has, for example, a maximum 20 MHz bandwidth, so that, when maximum five CCs are bundled, a wide band of maximum 100 MHz is provided.

With the example shown in FIG. 1A, a case is illustrated in which a macro cell and/or a small cell to use licensed bands and small cells to use unlicensed bands employ CA. When CA is employed, one radio base station's scheduler controls the scheduling of a plurality of CCs. Based on this, CA may be referred to as "intra-base station CA" (intra-eNB CA) as well.

In this case, the small cells to use unlicensed bands may be TDD carriers that support both DL/UL (scenario 1A) may be carriers for use in DL communication only (scenario 1B), or may be carriers for use in UL communication only (scenario 1C). A carrier that is used for DL communication only is also referred to as a "supplemental downlink" (SDL). Note that FDD and/or TDD can be used in the licensed bands.

Furthermore, a (co-located) structure may be employed here in which a licensed band and an unlicensed band are transmitted and received via one transmitting/receiving point (for example, a radio base station). In this case, this transmitting/receiving point (for example, an LTE/LTE-U base station) can communicate with a user terminal by using both the licensed band and the unlicensed band. Alternatively, it is equally possible to employ a (non-co-located) structure in which a licensed band and an unlicensed band are transmitted and received via different transmitting/receiving points (for example, one via a radio base station and the other one via an RRH (Remote Radio Head) that is connected with the radio base station).

FIG. 1B shows a scenario to employ dual connectivity (DC) by using licensed bands and unlicensed bands. DC is the same as CA in bundling a plurality of CCs (or cells) into a wide band. While CA is based on the premise that CCs (or cells) are connected via ideal backhaul and is capable of coordinated control, which produces very little delay time, DC presumes cases in which cells are connected via non-ideal backhaul, which produces delay time that is more than negligible.

Consequently, in DC, cells are run by separate base stations, and user terminals communicate by connecting with cells (or CCs) that are run by different base stations in different frequencies. So, when DC is employed, a plurality of schedulers are provided individually, and these multiple schedulers each control the scheduling of one or more cells (CCs) managed thereunder. Based on this, DC may be referred to as "inter-base station CA" (inter-eNB CA). Note that, in DC, carrier aggregation (intra-eNB CA) may be employed per individual scheduler (that is, base station) that is provided.

The example shown in FIG. 1B illustrates a case where a macro cell to use a licensed band and small cells to use unlicensed bands employ DC. If, in this case, a structure is employed in which a licensed band and an unlicensed band are transmitted and received separately via different transmitting/receiving points, the small cells to use unlicensed bands need to be carriers that support both DL/UL (scenario 2A), but may also be carriers for use in DL communication only (scenario 2B) if used in a structure in which a licensed band and an unlicensed band are transmitted and received via one transmitting/receiving point, or may be carriers for use in UL communication only (scenario 2C). Note that the macro cell to use a licensed band can use FDD and/or TDD.

In the example shown in FIG. 1C, stand-alone (SA) is employed, in which a cell to run LTE by using an unlicensed band operates alone. Stand-alone here means that communication with terminals is possible without employing CA or DC. In this case, the unlicensed band can be run in a TDD carrier (scenario 3).

In the operation modes of CA and DC shown in FIG. 1A and FIG. 1B, for example, it is possible to use a licensed band CC (macro cell) as a primary cell (PCell) and use an unlicensed band CC (small cell) as a secondary cell (SCell). Here, the primary cell (PCell) refers to the cell that manages RRC connection, handover and so on when CA/DC is used, and is also a cell that requires UL communication such as data and feedback signals from user terminals. The primary cell is always configured in the uplink and the downlink. A secondary cell (SCell) is another cell that is configured in addition to the primary cell when CA/DC is employed. Secondary cells may be configured in the downlink or the uplink alone, or may be configured in both the uplink and the downlink at the same time.

Note that, as shown in above FIG. 1A (CA) and FIG. 1B (DC), a mode to presume the presence of licensed-band LTE (licensed LTE) when running LTE-U is referred to as "LAA" (Licensed-Assisted Access) or "LAA-LTE." Note that systems that run LTE/LTE-A in unlicensed bands may be collectively referred to as "LAA," "LTE-U," "U-LTE" and so on.

In LAA, licensed band LTE and unlicensed band LTE are coordinated so as to allow communication with user terminals. LAA may be structured so that a transmission point (for example, a radio base station) to use a licensed band and a transmission point to use an unlicensed band are, when being a distance apart, connected via a backhaul link (for example, optical fiber, the X2 interface and so on).

Now, in a system in which LTE/LTE-A is run in unlicensed bands (for example, an LAA system), interference control that is for use in the same frequency and that is based on LBT (Listen Before Talk) mechanism is under study in order to allow co-presence with other operators' LTE, Wi-Fi or different systems. In a carrier in which LBT is configured, radio base stations and user terminals of a plurality of systems use the same frequencies on a shared basis.

LBT can prevent interference between LAA and Wi-Fi, interference between LAA systems, and so on. Even when user terminals that can be connected are controlled independently for every operator that runs an LAA system, it is possible to reduce interference without learning the details of each operator's control, by means of LBT.

Note that, in the present description, "listening" refers to the operation which a given transmission point (for example, a radio base station, a user terminal, etc.) performs before transmitting signals in order to check whether or not signals to exceed a predetermined level (for example, predetermined power) are being transmitted from other transmission points. Also, this "listening" performed by radio base stations and/or user terminals may be referred to as "LBT" (Listen Before Talk), "CCA" (Clear Channel Assessment), and so on.

In LTE-systems to use LBT, an LTE-U base station and/or a user terminal perform listening (LBT) before transmitting signals in an unlicensed band cell, and, if no signal from other systems (for example, Wi-Fi) and/or other LAA transmission points is detected, the LTE-U base station and/or the user terminal carry out unlicensed band communication.

If received power that is equal to or lower than a predetermined threshold is measured in LBT, a transmission point (for example, a radio base station) judges that the channel is in an idle state (LBT_idle), and carries out transmission. When a "channel is idle," this means that, in other words, the channel is not occupied by a certain system, and it is equally possible to say that the channel is "clear," the channel is "free," and so on.

On the other hand, when the received power that is measured in LBT exceeds a predetermined threshold, the transmission point judges that the channel is in a busy state (LBT_busy), and does not carry out transmission. In the event of LBT_busy, LBT is carried out again with respect to this channel, and the channel becomes available for use only after it is conformed that the channel is in the idle state. Note that the method of judging whether a channel is in an idle state/busy state based on LBT is by no means limited to this.

As LBT schemes, FBE (Frame Based Equipment) and LBE (Load Based Equipment) are currently under study. Differences between these include the frame configurations to use for transmission/receipt, the channel-occupying time, and so on. FBE introduces fixed timings in LBT-related transmitting/receiving configurations. Also, in LBE, the configurations of transmission/receipt pertaining to LBT are not fixed in the time direction, and LBT is carried out on an as-needed basis.

To be more specific, FBE refers to an LBT mechanism with a fixed frame cycle, which carries out transmission if the result of executing carrier sensing in a predetermined frame shows that the channel is available for use, but does not make transmission and waits until the next carrier sensing timing if the channel cannot be used.

On the other hand, LBE refers to an LBT mechanism that extends the carrier sensing duration when the result of carrier sensing shows that the channel cannot be used, and continues carrier sensing until the channel becomes available for use. In, LBE, random backoff is required to avoid contention adequately. Note that the carrier sensing duration (also referred to as the "carrier sensing period") may refer to the time where listening and/or other processes are performed to decide whether or not a channel can be used thus gain one LBT result (for example, the duration of one OFDM).

Figure 2B:
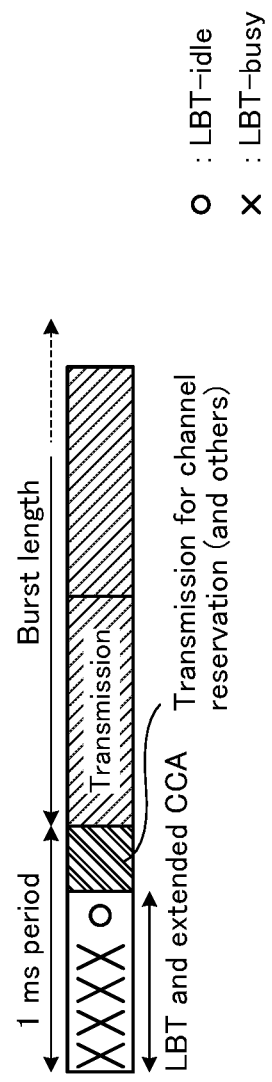

FIG. 2 provide diagrams, each showing an example radio frame configuration in LBT. FIG. 2A shows an example of an FBE radio frame configuration. In the event of FBE, the LBT duration and the LBT cycle are fixed, and LBT is performed in a predetermined number of symbols (for example, one to three symbols) and a cycle (for example, every 1 ms). Meanwhile, FIG. 2B shows an example of an LBE radio frame configuration. In the event of LBE, the LBT duration is not fixed. For example, LBT symbols may continue until a predetermined condition is fulfilled. To be more specific, the radio base station may continue executing LBT until LBT-idle is observed.

Note that, as shown in FIG. 2A and FIG. 2B, it is possible to employ a structure in which, once the radio base station enters "LBT-idle," LBT is skipped for a predetermined period (burst length), and, even if FBE is in use, LBT may be skipped likewise.

Also, a transmission point can transmit predetermined signals based on the result of LBT. Here, the result of LBT refers to information about the state of channel availability (for example, "LBT-idle," "LBT-busy," etc.), which is acquired by LBT in carriers where LBT is configured.

For example, as shown in FIG. 2B, a channel reservation signal may be transmitted based on the result of LBT. Here, the channel reservation signal refers to a signal that is transmitted when an LBT result shows that a channel is free, in order to prevent this channel from being identified as free in LBT by other transmission points, and may also be referred to as a "transmission reservation signal," a "beacon signal" (BRS: Beacon Reference Signal), and so on.

For example, when the result of LBT at a predetermined timing in a given subframe identifies a free channel, a channel reservation signal may be transmitted during the remaining period in the subframe (the period from the above timing to the beginning of the next subframe). According to this configuration, after a given transmission point judges that a channel is free, other transmission points judge that the channel is busy based on the channel reservation signal, so that it is possible to prevent contention of data transmission signals.

FIG. 3 provide diagrams to explain advantages and disadvantages of FBE. FIG. 3 show examples in which radio base stations (eNBs) that use the same frequency band with other systems on a shared basis execute LBT based on FBE. With FBE, operations to make the frequency reuse factor within the same system 1 (reuse factor 1 operations) can be implemented relatively easily. FIG. 3A shows an example in which three eNBs (eNBs 1 to 3) are synchronized. In this way, if every eNB is synchronized and executes LBT, reuse factor 1 operations is made possible without blocking each other.

Note that the reuse factor refers to the rate the same frequency is used in a network. That is, when the reuse factor is 1 in a given system, this means that all the cells in this system use the same frequency. Also, "synchronization" herein not only refers to complete synchronization in time, but also covers states with gaps equal to less than a predetermined time from complete synchronization. For example, when a plurality of transmission points are synchronized, this may mean that a plurality of transmission points carry out signal processing (such as transmission/receipt) in complete synchronization, or this may mean that a plurality of transmission points carry out signal processing with certain gaps in time (for example, with gaps of 3 μs or less).

On the other hand, with FBE, once carrier sensing fails, the channel cannot be used even if the channel becomes free before the next carrier sensing timing, and therefore the spectral efficiency is low. FIG. 3B shows an example in which the communication ranges of an LAA eNB and a Wi-Fi AP (access point) overlap. Once LBE equipment like the Wi-Fi AP occupies a channel, the LAA eNB to use FBE cannot occupy the channel, even if the channel becomes available for use later, until an LBT timing arrives. That is, FBE equipment and LBE equipment that are co-present in the same frequency do not have equal opportunities for occupying channels.

Also, when a number of pieces of FBE equipment are co-present, if one piece of equipment occupies a channel, the other pieces of equipment are blocked from accessing the channel until the first channel finishes communicating. FIG. 3C shows an example in which the communication ranges of two LAA eNBs overlap. In this way, where there are asynchronous FBE nodes (for example, nodes that are run by different operators), if one starts communicating, the rest is kept blocked.

FIG. 4 provide diagrams to explain advantages and disadvantages of LBE. FIG. 4 shows examples in which radio base stations (eNBs) that share the same frequency band with other systems execute LBT based on LBE. In LBE, transmission can be started as soon as a channel is free, and therefore the spectral efficiency is high. Also, channel access opportunities are gained as much as in Wi-Fi where LBE is used. Although FIG. 4A shows a configuration that is similar to that shown in FIG. 3B, unlike FIG. 3B, it is possible to judge that a channel is free at the timing Wi-Fi transmission ceases. Consequently, LBE enables efficient co-presence with Wi-Fi that likewise uses LBE.

Meanwhile, in LBE, even in the same system, the timing to start transmission varies in every piece of equipment, depending on the result of LBT, and therefore it is possible to maintain the system in synchronization. FIG. 4B shows an example in which a given LAA eNB (eNB2) has an communication range that overlaps another LAA eNB (eNB1) and a Wi-Fi AP. In this example, eNB1 and the Wi-Fi AP are both outside each other's communication ranges. Because eNB1 and eNB2 each change the timing to start transmission depending on the result of LBT, the carrier sensing timing varies between the nodes, and, as a result of this, transmission in one node influences the carrier sensing in the other node, and, even at times the Wi-Fi AP is not communicating, reuse factor 1 operations is difficult to implement.

As described above, there is a problem with FBE and LBE, which are presently under study, that it is difficult to achieve a good balance between efficient and fair co-presence with other systems and efficient reuse factor 1 operations within the subject system.

So, the present inventors have worked on a frame configuration and an LBT mechanism that can achieve the advantages of both FBE and LBE. The present inventors have focused on the fact that, even when LBE is used, reuse factor 1 operations can be realized if carrier sensing timings can be coordinated between nodes in the same system, and arrived at one aspect of the present invention.

According to one aspect of the present invention, while each transmission point in an LAA system normally executes carrier sensing based on LBE, each transmission point also carries out short-duration carrier sensing at predetermined timing. Assuming that synchronization is established within the same LAA system, this short-duration carrier sensing can be performed by coordinating the timings between nodes within the system.

On the other hand, other operators and other RATs (Radio Access Technology) such as Wi-Fi are not synchronized with the above LAA system, and therefore it is difficult to coordinate the carrier sensing timings precisely. Even if the carrier sensing timings match, transmission points of the above LAA system can prevent other operators' systems and/or other RATs from judging that the result of LBT is "free," by using short-duration carrier sensing. That is, an LAA system can block unsynchronized systems so as to avoid interference.

Also, the present inventors have further generalized and worked on the above-noted point of focus, and come up with the idea that reuse factor 1 operations may be possible if transmission in one node in a system can be made undetectable by carrier sensing by another node in the same system. Then, the present inventors have focused on the fact that, although LBT results are decided based on a comparison of measured received power with a predetermined threshold, there are no rules as to how, specifically, this this measurement should be conducted, and arrived at another aspect of the present invention.

According to another aspect of the present invention, specific rules are introduced to the signal transmission methods/measurement methods in the same LAA system, and signals that cannot be detected by carrier sensing are transmitted, only within the same system. Other operators' systems and other RAT systems do not know the above specific rules, and therefore cannot execute carrier sensing that takes the above LAA system's signals into account. That is, the LAA system can block other systems so as to avoid interference.

Consequently, according to these aspects of the present invention, it is possible to achieve a good balance between efficient and fair co-presence with other systems and efficient reuse factor 1 operations within the subject system. That is, it becomes possible to maximize the advantages of LTE in LAA, and achieve high spectral efficiency.

Now, embodiments of the present invention will be described in detail below with reference to the accompanying drawings. Note that, although, in the following description, cases will be described as examples in which a radio base station transmits downlink signals (DL signals) in an unlicensed band by using LBT, in a structure where a licensed band cell (PCell) and an unlicensed band cell (SCell) execute carrier aggregation, the application of the present invention is by no means limited to this. For example, when a transmission point (for example, a user terminal) transmits uplink signals (UL signals) by using LBT, the subframe configurations (LBT configurations) that will be shown below with each embodiment may be applied.

First Embodiment

With a first embodiment, each transmission point (for example, a radio base station) executes LBT in a plurality of varying lengths of time. Also, carrier sensing of a predetermined length of time is configured to be executed at specific timings. The first embodiment is structured to synchronize the timings of a plurality of transmission points within a system, so that, unlike conventional LBE, opportunities to perform carrier sensing are secured at the same timings between radio base stations.

Here, LBT that is executed at these specific timings is performed in a shorter time than other lengths of time. For example, this short time is preferably shorter than the duration of carrier sensing that is normally executed at arbitrary timings (for example, the length of one OFDM symbol (for example, 66.7 μs) in LTE/LTE-A). Note that short time carrier sensing such as this may also be referred to as "short-time carrier sensing," "synchronous carrier sensing," "special carrier sensing" and so on.

Also, the duration of short-duration carrier sensing is preferably shorter than the duration of carrier sensing used in other systems such as Wi-Fi. For example, the duration of short-duration carrier sensing is preferably shorter than the frame space (IFS: Inter-Frame Space) that is stipulated in IEEE 802.11 series, which is a wireless LAN standard, and preferably shorter than at least one of the DIFS (Distributed coordination function IFS), the PIFS (Point coordination function IFS) and the SIFS (Short IFS). In IEEE 802.11, the DIFS is stipulated to be 28 μs, 34 μs, 50 μs and so on.

Short-duration carrier sensing may be executed at periodic timings, or may be executed at timings that are determined based on predetermined rules. Also, short-duration carrier sensing is preferably configured to be executed shortly before predetermined subframes. To be more specific, short-duration carrier sensing may be configured to be executed in an OFDM symbol immediately before part of the subframes, or may be configured to be executed in an OFDM symbol immediately before each subframe.

For example, short-duration carrier sensing may be executed using several tens of μs, approximately, immediately before subframe boundaries in all subframes. Note that "immediately before" a predetermined subframe is not necessarily limited to mean one symbol before the predetermined subframe, and can mean two symbols before, several symbols before, and so on. Also, short-duration carrier sensing may be expressed to be executed at the end of a predetermined subframe, and, for example, expressed to be executed in the last symbol in a predetermined subframe, in several symbols at the end, and so on.

Also, once a node assumes "LBT-idle" and starts transmission, short-duration carrier sensing may be skipped in transmitting subframes. For example, after transmission is started, it is possible to perform short-duration carrier sensing shortly before the first subframe is finished, and skip short-duration carrier sensing in subsequent transmitting subframes. By using the time that is gained by skipping carrier sensing for each transmitting subframe for the allocation of data signals, it is possible to improve the throughput.

In a system where the first embodiment is applied, it may be possible that, after a given radio base station becomes "LBT-idle," the band may be occupied until there is no more data to transmit from this radio base station. Consequently, once a given radio base station becomes "LBT-idle" and a predetermined period (burst period) passes, it is preferable to provide some idle periods where this radio base station does not execute LBT (including short-duration carrier sensing). Also, the idle periods may be configured so that LBT is not executed, and, furthermore, transmission is not made by disregarding the result of executing LBT either. By this means, it is possible to guarantee the equality of the network with other systems and/or other operators' LAA systems.

FIG. 5 is a diagram to show an example of carrier sensing according to the first embodiment. In FIG. 5, two eNBs (eNB1 and eNB2) are run by an operator A, and execute carrier sensing in accordance with the first embodiment. FIG. 5 assumes a structure to execute short-duration carrier sensing immediately before each subframe that is not an idle period. Also, the duration of short-duration carrier sensing in eNB1 and eNB2 under operator A is configured to be shorter than the duration of normal carrier sensing which eNB1, eNB2 and an operator B's eNB3 execute at times not immediately before each subframe, and shorter than the duration of carrier sensing which a Wi-Fi AP executes.

Also, eNB3 is run by operator B, which is different from operator A. Furthermore, a Wi-Fi AP, which is related to neither operator, is placed. In FIG. 5, eNB1 might interfere with eNB2 and eNB3, but does not interfere with the distant Wi-Fi AP. Also, eNB2 might interfere with eNB1, eNB3 and the Wi-Fi AP.

The Wi-Fi AP transmits a signal in the first predetermined period that is illustrated. Consequently, the result of LBT in eNB2 in this period is "busy." Meanwhile, the result of LBT in eNB1 in this period is "free," so that eNB1 executes transmission in subframe #1. Although eNB2 continues listening (normal carrier sensing) based on LBE, eNB1 is engaged in transmission even after the Wi-Fi AP finishes transmission, so that the busy state continues.

In the period at the end of each subframe, eNB1 and eNB2 can execute short-duration carrier sensing at the same timing. Consequently, despite the fact that eNB1 is still transmitting data (in the burst period period), eNB1 and eNB2 judge that the result of LBT is "free" in subframe #1.

Because the LBT result is "free," eNB2 also starts transmission from subframe #2. Now, in the middle of subframe #2, eNB3 starts executing LBT in order to start transmission. Now, in the middle of subframe #3, the Wi-Fi AP starts executing LBT in order to start transmission. However, the specific period in which eNB1 and eNB2 execute carrier sensing periodically (the carrier sensing duration at the end of subframes) is shorter than the duration of carrier sensing which eNB3 and Wi-Fi AP execute. Consequently, even if eNB3 and the Wi-Fi AP performs LBT in this specific period in subframes #2 and #3, these LBT results will only yield "busy."

Note that, although FIG. 5 shows an example in which short-duration carrier sensing is performed in subframes #2 and #3, as described earlier, it is equally possible to use a structure in which short-duration carrier sensing is not performed in these subframes, and in which data transmission is carried out in radio resources that match the duration of short-duration carrier sensing.

As has been described with reference to FIG. 5, according to the first embodiment, even if part of the nodes in the same system (operator) starts transmission first and normal carrier sensing shows that this transmission blocks the other nodes in the system (operator), in carrier sensing durations at specific timings, the nodes in the system stop transmission (every node in the system performs carrier sensing) and therefore can avoid blocking each other within the system.

Note that, generally, nodes within an operator can be run in the same frequency without interfering with each other much, by using meticulous floor planning, interference control and so on. On the other hand, such holistic control is not applied to nodes across operators, and therefore cases might occur where significant interference is produced due to signal contention.

Consequently, when a plurality of operators execute short-duration carrier sensing in accordance with the first embodiment, operator (system)-specific random timing offsets may be configured in short-duration carrier sensing. For example, these offsets may be randoms that are generated based on operator-specific values. By this means, even when inter-operator synchronization is applied, the timings of short-duration carrier sensing are operator-specific, so that contention can be avoided. Also, by applying random offsets, it is possible to secure the equality of communication in each operator.

As described above, according to the first embodiment of the present invention, at specific timings that are synchronized within the same system (operator), each node can perform carrier sensing of a shorter time than normal carrier sensing. By this means, it is possible to coordinate carrier sensing timings within the same system (operator) where synchronization is established, it is possible realize reuse factor 1 operations without interruption from other operators, other RATs and so on.

Note that it is preferable that user terminals perform receiving process taking short-duration carrier sensing into account. For example, it is possible to use a structure in which, when a radio base station performs short-duration carrier sensing at the end of each subframe, a user terminal always assumes that no data transmission takes places in the last OFDM symbol of subframes, and applies rate matching in an unlicensed band carrier (for example, SCell).

Here, information about short-duration carrier sensing may be reported between radio base stations (for example, from a macro base station to a small base station), or may be reported from a radio base station and a user terminal. For example, this information may be reported in a control signal (for example, DCI (Downlink Control Information)), or may be reported in higher layer signaling (for example, MAC signaling, RRC signaling, a broadcast signal and so on). Also, the report may be sent from a licensed band (for example, a PCell), or may be sent from an unlicensed band (for example, an SCell). Also, if common configuration is applied to a user terminal and a radio base station this information needs not be reported.

The information about short-duration carrier sensing may include, for example, information about the timings of short-duration carrier sensing (for example, the cycle in which short-duration carrier sensing is performed, subframe offsets, subframe indices, symbol locations, etc.), or include the period of short-duration carrier sensing (for example, symbol locations, the number of symbols, the duration of execution, etc.). Also, information about the burst period and the idle period may be reported likewise.

Note that, although the first embodiment is structured so that each transmission point performs LBT in a plurality of varying lengths of time, this is by no means limiting. For example, a structure may be employed in which a transmission point performs short-duration carrier sensing only.

Also, the present inventors have focused on short-duration carrier sensing, and found out that when, with the first embodiment, short-duration carrier sensing is performed at periodic timings, LBT is executed by using a FBE-based mechanism. Based on this finding, the present inventors have come up with the idea that, when short-duration carrier sensing is used, even if carrier sensing is executed basically based on LBE, the transmitting and receiving processes (such as listening) can be controlled to fulfill the specifications of LBT requirements for FBE (operation parameters). Note that, as for the specifications of requirements for LBT, for example, there are ones that are stipulated by the ETSI (European Telecommunications Standards Institute), but these are by no means limiting.

Figure 13:
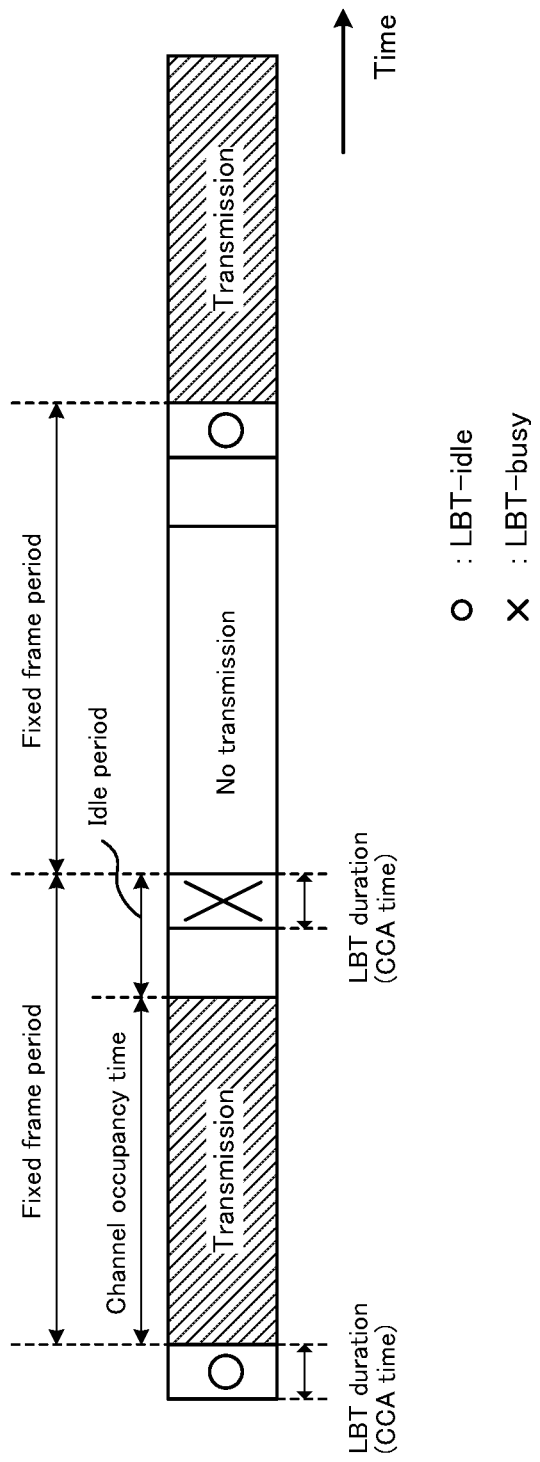
FIG. 13 is a diagram to show an example of a radio frame configuration in FBE-based LBT.

The specifications of requirements for LBT will be described with reference to FIG. 13. FIG. 13 is a diagram to show an example of a radio frame configuration in FBE-based LBT. As has been described with FIG. 2, in FBE, the frame length is fixed, and LBT is executed in a cycle of the frame length. If the result of LBT yields "LBT-idle," a transmission node can transmits signals for a predetermined period of time (channel occupancy time). Also, in FBE, it is possible to provide a time (idle period) in which no signals are transmitted, in each frame. In this case, the frame length is the cycle of short-duration carrier sensing, and equals the sum of the channel occupancy time and the idle period. Note that an LBT duration may be included in an idle duration.

The specifications of requirements for FBE LBT are under study to place the channel occupancy time within a predetermined range (for example, minimum 1 ms to maximum 10 ms), and/or to define the idle period based on its relationship with the channel occupancy time (for example, by setting the idle period to be at least 5% of the channel occupancy time).

So, according to embodiment of the present invention, when short-duration carrier sensing is used, a transmission point, for example, controls the channel occupancy time and/or the idle period to fulfill the specifications of requirements for LBT FBE (including the above-noted time range, relationship and so on). For example, a transmission point may control downlink signal transmission so that, in one cycle of executing short-duration carrier sensing, the time downlink signals are not transmitted is at least 5% of the time downlink signals are transmitted. Also, the frame length (the cycle of short-duration carrier sensing) according to the specifications of LBT requirements for FBE may be the sum of the channel occupancy time and the idle period, or may be a longer cycle than this sum. By this means, it is possible to adequately guarantee the equality of the network with other systems that use FBE, and/or other operators' LAA systems.

Second Embodiment

With a second embodiment, when channel reservation signals are transmitted, each radio base station makes part of the radio resources (for example, time and/or frequency resources) non-transmission radio resources. Here, a group of radio resources where channel reservation signals are placed may be referred to as a "transmission pattern," and a group of radio resources where no channel reservation signals are placed may be referred to as a "non-transmission pattern."

According to the second embodiment, system (operator)-specific channel reservation signal transmission patterns (or non-transmission patterns) are used, so that a node in a system is able to accurately estimate the interference from signals outside the system by using non-transmission resources, even when there are channel reservation signals from other nodes in the system. That is, a transmission pattern (or a non-transmission pattern) is not necessarily formed with all the radio resources before the next subframe, but is formed with a group of partial radio resources, and formed so that part of the radio resources are different from those of other operators' (or other systems') channel reservation signal transmission patterns (or non-transmission patterns).

A predetermined system's channel reservation signal transmission pattern cannot be seen from nodes outside the system. Consequently, in a period in which a given node in this predetermined system transmits a channel reservation signal, the result of LBT in nodes outside the system only yields "busy."

As for the transmission patterns of channel reservation signals, radio resource mapping patterns that are used for reference signals in existing systems (for example, LTE Rel-11) such as synchronization signals (PSS (Primary Synchronization Signal)/SSS (Secondary Synchronization Signal)), the CRS (Cell-specific Reference Signal), the CSI-RS (Channel State Information Reference Signal), the PRS (Positioning Reference Signal), the DM-RS (Demodulation Reference Signal) or combinations of these may be used. Also, as transmission patterns, it is also possible to use mapping patterns that are newly defined for channel reservation radio resources (including ones that modify existing signal mapping patterns).

Note that, where there are a group of radio resources used for synchronization signals, reference signals or combinations of these, the mapping patterns used for part of these radio resources may be used as transmission patterns. Meanwhile, the mapping patterns of part or all of the radio resources used for synchronization signals, reference signals or combinations of these may be used as non-transmission patterns.

Figure 6:
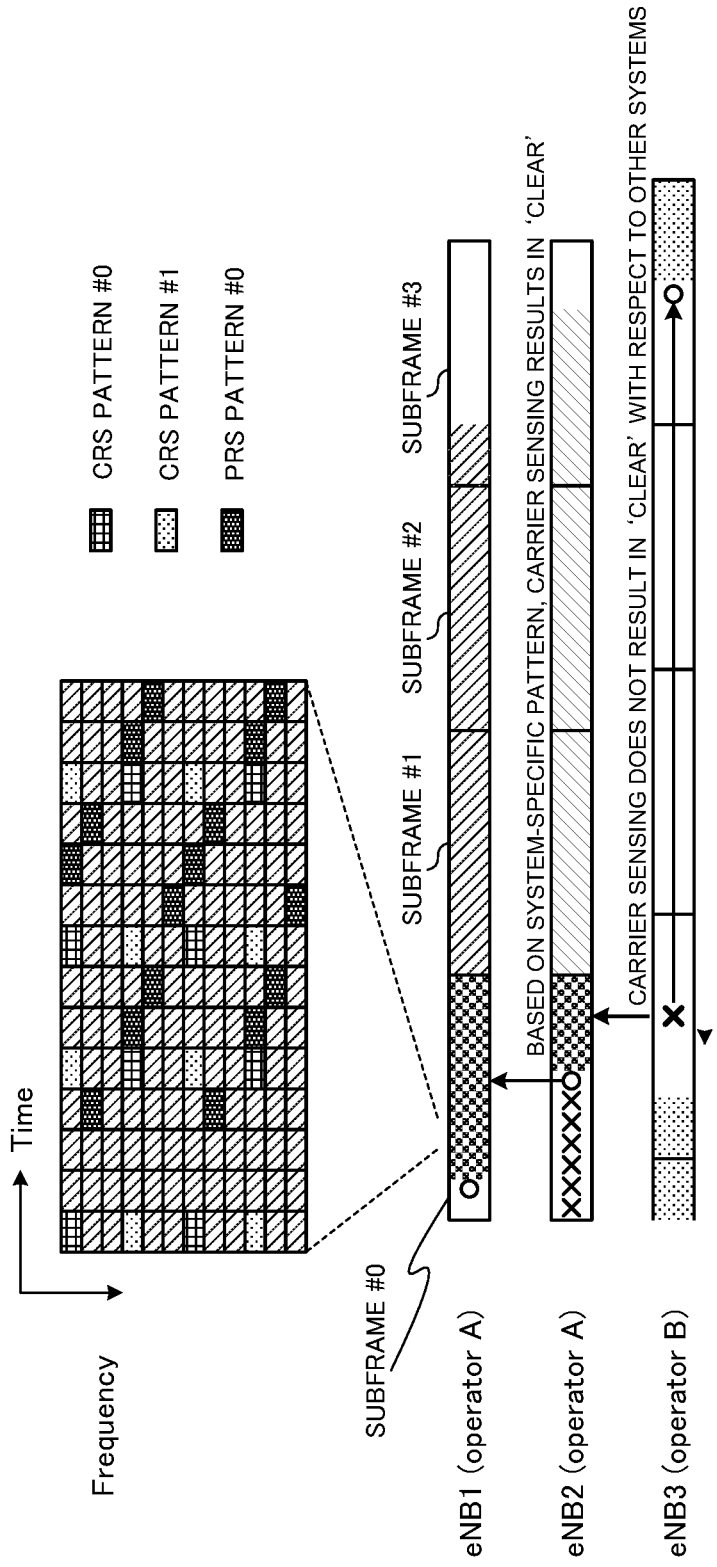
FIG. 6 is a diagram to show an example of carrier sensing according to a second embodiment.

FIG. 6 is a diagram to show an example of carrier sensing according to the second embodiment. In FIG. 6, two eNBs (eNB1 and eNB2) are run by operator A and execute carrier sensing in accordance with the second embodiment. To be more specific, carrier sensing in eNB1 and eNB2 is carried out in radio resources that belong to non-transmission patterns of operator A's channel reservation signals.

Also, eNB3 is run by operator B, which is different from operator A. FIG. 6, eNB1 might interfere with eNB2, but, meanwhile, does not interfere with eNB3 that is distant. Also, eNB2 might interfere with eNB1 and eNB3. eNB1 to eNB3 execute carrier sensing in accordance with LBE.

In the example of FIG. 6, eNB3 transmits a signal in the first predetermined period that is illustrated. Consequently, the result of LBT in eNB2 in this period yields "busy." On the other hand, the result of LBT in eNB1 in this period is "free," and therefore eNB1 transmits a channel reservation signal in subframe #0.

For example, channel reservation signals may be transmitted in either of the parts that correspond to CRS resources shown in FIG. 6 (CRS patterns #0 and #1), or may be transmitted in the part corresponding to PRS resources (PRS pattern #0). Also, channel reservation signals may be transmitted in the rest of the radio resources where these are not transmitted.

In subframe #0, eNB2 repeats listening based on LBE. After eNB3 finishes transmission, carrier sensing in eNB2 is executed in radio resources where eNB1's channel reservation signal is not transmitted, so that the channel is judged to be free.

On the other hand, if eNB3 performs carrier sensing during the period (part of subframe #0) in which eNB1 or eNB2 transmits a channel reservation signal, the channel is judged to be busy.

As described above, according to the second embodiment of the present invention, channel reservation signals are transmitted in resource mapping patterns that are system (operator)-specific. By executing carrier sensing while channel reservation signals are transmitted, nodes in the same system can estimate power that does not include interference, so that nodes in the system can realize reuse factor 1 operations without blocking each other.

Note that the transmission patterns of channel reservation signals are by no means limited to the above-described resource mapping patterns. For example, transmission patterns may be configured so that only part of the frequency resources (subcarriers) are made non-transmission resources. According to this configuration, even when the timing and period of carrier sensing are not coordinated with OFDM symbols, in which resources carrier sensing should be performed so that power in which the interference in the same system is not included can be measured is clear, and therefore implementation is easy.

Figure 7:
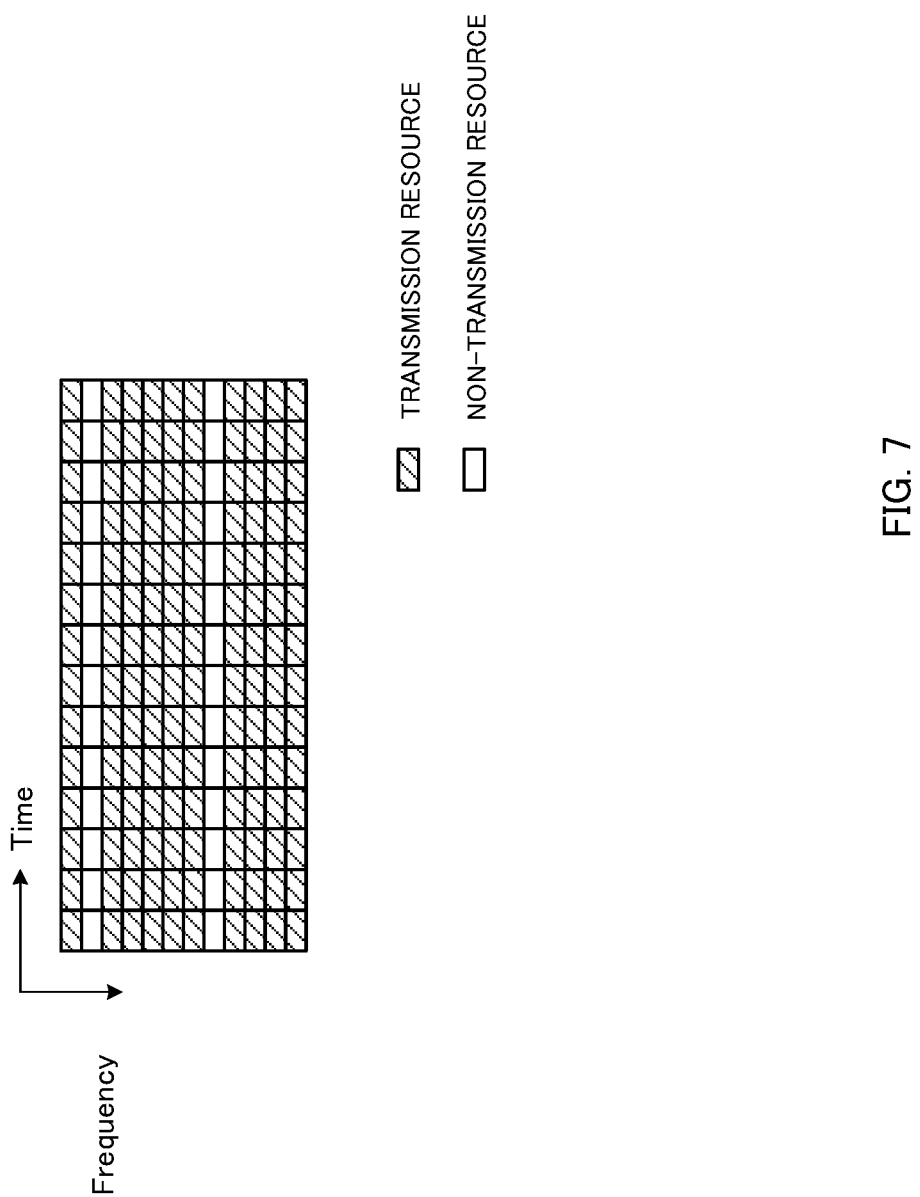
FIG. 7 is a diagram to show an example of a channel reservation signal that makes part of subcarriers non-transmission subcarriers.

FIG. 7 is a diagram to show an example of channel reservation signals that make part of the subcarriers non-transmission subcarriers. In FIG. 7, two subcarriers (non-transmission resources) are made non-transmission subcarriers (muted), and channel reservation signals are transmitted in the rest of the subcarriers (transmission resources).

Information as to in which radio resources (subcarriers, symbols, etc.) transmission is made (or transmission is not made)—that is, information about the patterns of channel reservation signal transmission resources and/or non-transmission resources—may be determined based on PLMN IDs (Public Land Mobile Network Identifiers) and so on, or may be configured by the remote surveillance function called "OAM" (Operations, Administration, Maintenance).

Also, information about channel reservation signal transmission resource and/or non-transmission resource patterns may be reported between radio base stations (for example, from a macro base station to a small base station), or may be reported to user terminals. For example, this information may be reported in control signals (for example, DCI), or may be reported in higher layer signaling (for example, MAC signaling, RRC signaling, a broadcast signal, etc.). Also, this report may be sent from a licensed band (for example, a PCell), or may be sent from an unlicensed band (for example, an SCell). Also, if configuration is set up in advance, this report needs not be sent.

Note that, although each embodiment described above assumes that a carrier where listening (LBT) is configured is an unlicensed band and a carrier where listening (LBT) is not configured is a licensed band, the application of the present invention is by no means limited to this. For example, it is equally possible that a carrier where listening (LBT) is configured is a licensed band and a carrier where listening (LBT) is not configured is an unlicensed band. Also, regarding PCells and SCells, the combination of licensed bands and unlicensed bands is not limited to the above-described configurations.

Also, although cases have been described with the above embodiments where the LBE mechanism is primarily used, the FBE mechanism is equally applicable. For example, short-duration carrier sensing according to the first embodiment may be used in FBE. In this case, normal-time carrier sensing and short-duration carrier sensing may be configured to be executed in different cycles. Also, the channel reservation signals according to the second embodiment may be used in FBE.

(Radio Communication System)

Now, the structure of the radio communication system according to an embodiment of the present invention will be described below. In this radio communication system, the radio communication methods according to the above-described embodiments of the present invention are employed. Note that the radio communication methods of the above-described embodiments may be applied individually or may be applied in combination.

Figure 8:
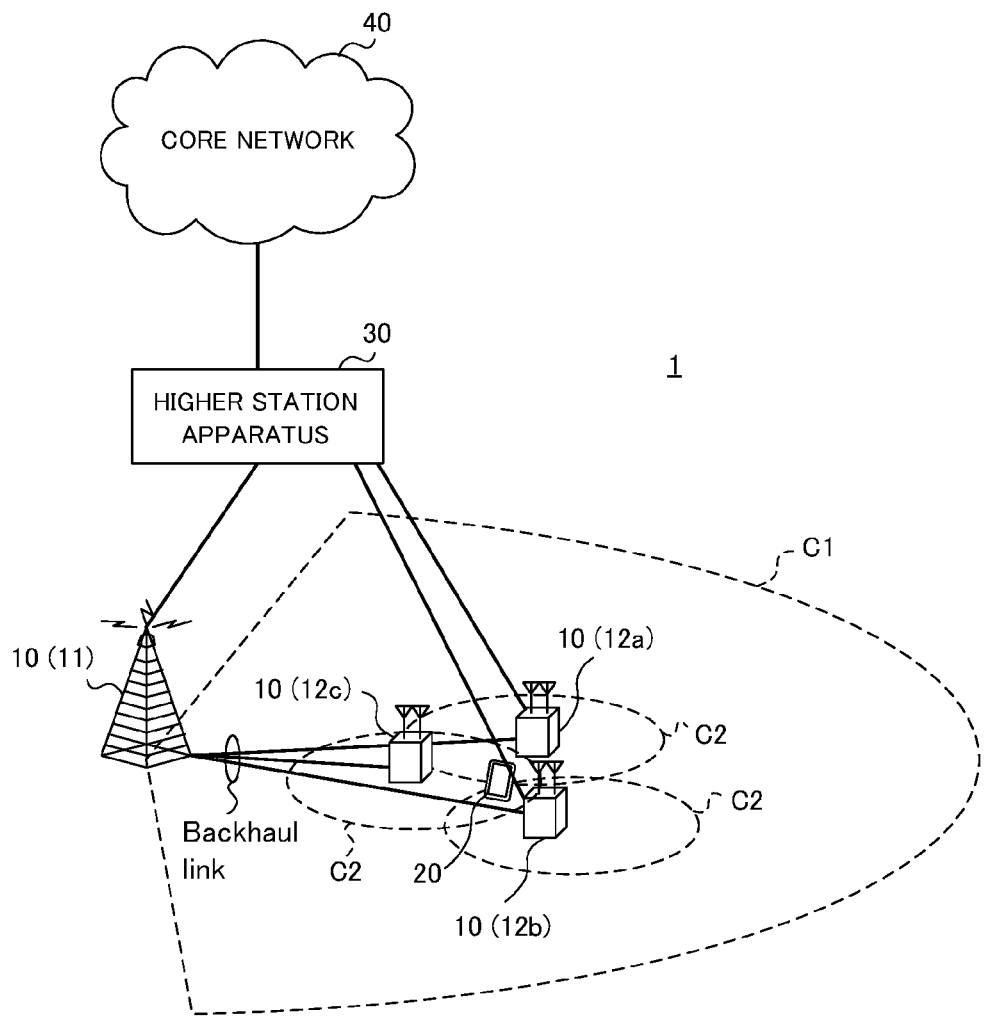
FIG. 8 is a diagram to show an example of a schematic structure of a radio communication system according to an embodiment of the present invention.

FIG. 8 is a diagram to show an example of a schematic structure of a radio communication system according to an embodiment of the present invention. Note that the radio communication system 1 shown in FIG. 8 is a system to incorporate, for example, an LTE system, super 3G, an LTE-A system and so on. The radio communication system 1 can adopt carrier aggregation (CA) to group a plurality of fundamental frequency blocks (component carriers) into one, where the LTE system bandwidth constitutes one unit, and/or adopt dual connectivity (DC). Also, the radio communication system 1 has a radio base station (for example, an LTE-U base station) that is capable of using unlicensed bands. Note that the radio communication system 1 may be referred to as "IMT-Advanced," or may be referred to as "4G," "5G," "FRA" (Future Radio Access) and so on.

The radio communication system 1 shown in FIG. 8 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2, which use different frequencies, at the same time, by means of CA or DC. For example, it is possible to transmit assist information (for example, the DL signal configuration) related to a radio base station 12 (which is, for example, an LTE-U base station) that uses an unlicensed band, from the radio base station 11 that uses a licensed band to the user terminals 20. Also, a structure may be employed here in which, when CA is used between the licensed band and the unlicensed band, one of the radio base stations (for example, the radio base station 11) controls the scheduling of the licensed band cells and the unlicensed band cells.

Note that it is equally possible to use a structure in which a user terminal 20 connects with a radio base station 12, without connecting with the radio base station 11. For example, it is possible to use a structure in which a radio base station 12 to use the unlicensed band connects with the user terminals 20 in stand-alone. In this case, the radio base station 12 controls the scheduling of the unlicensed band cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. Also, it is preferable to configure radio base stations 10 that use the same unlicensed band on a shared basis to be synchronized in time.

The user terminals 20 are terminals to support various communication schemes such as LTE, LTE-A and so on, and may include both mobile communication terminals and fixed communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) are communicated in the PBCH.

The L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH By means of the PRACH, random access preambles for establishing connections with cells are communicated.

Figure 9:
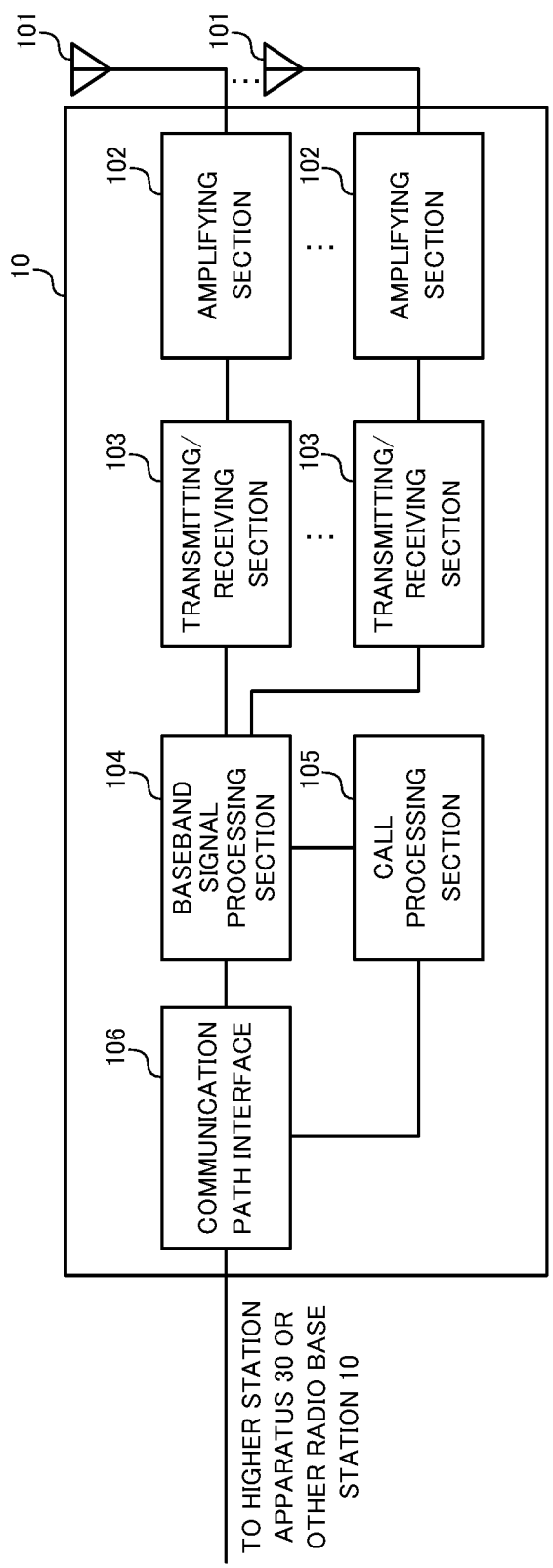
FIG. 9 is a diagram to show an example of an overall structure of a radio base station according to an embodiment of the present invention.

FIG. 9 is a diagram to show an example of an overall structure of a radio base station according to one embodiment of the present invention. The radio base station 10 has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 may be comprised of transmitting sections and receiving sections. Also, although multiple transmitting/receiving antennas 101 are provided here, it is also possible to provide only one.

User data to be transmitted from the radio base station 10 to a user terminal 20 on the downlink is input from the higher station apparatus 30, into the baseband signal processing section 104, via the transmission path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Also, the baseband signal processing section 104 reports, to the user terminal 20, control information (system information) for allowing communication in the cell, through higher layer signaling (for example, RRC signaling, broadcast information and so on). The information for allowing communication in the cell includes, for example, the system bandwidth on the uplink, the system bandwidth on the downlink, and so on. Also, assist information related to unlicensed band communication may be transmitted from the radio base station (for example, the radio base station 11) to the user terminal 20 by using a licensed band.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103, and output to the baseband signal processing section 104. Also, the transmitting/receiving sections 103 receive a signal that includes predetermined information about the PUSCH transmission from the user terminal 20, and outputs this to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) to and from other radio base stations 10 (for example, neighboring radio base stations) via an inter-base station interface (for example, optical fiber, the X2 interface, etc.). For example, the communication path interface 106 may transmit and receive information about the subframe configuration that relates to LBT, to and from other radio base station 10.

Figure 10:
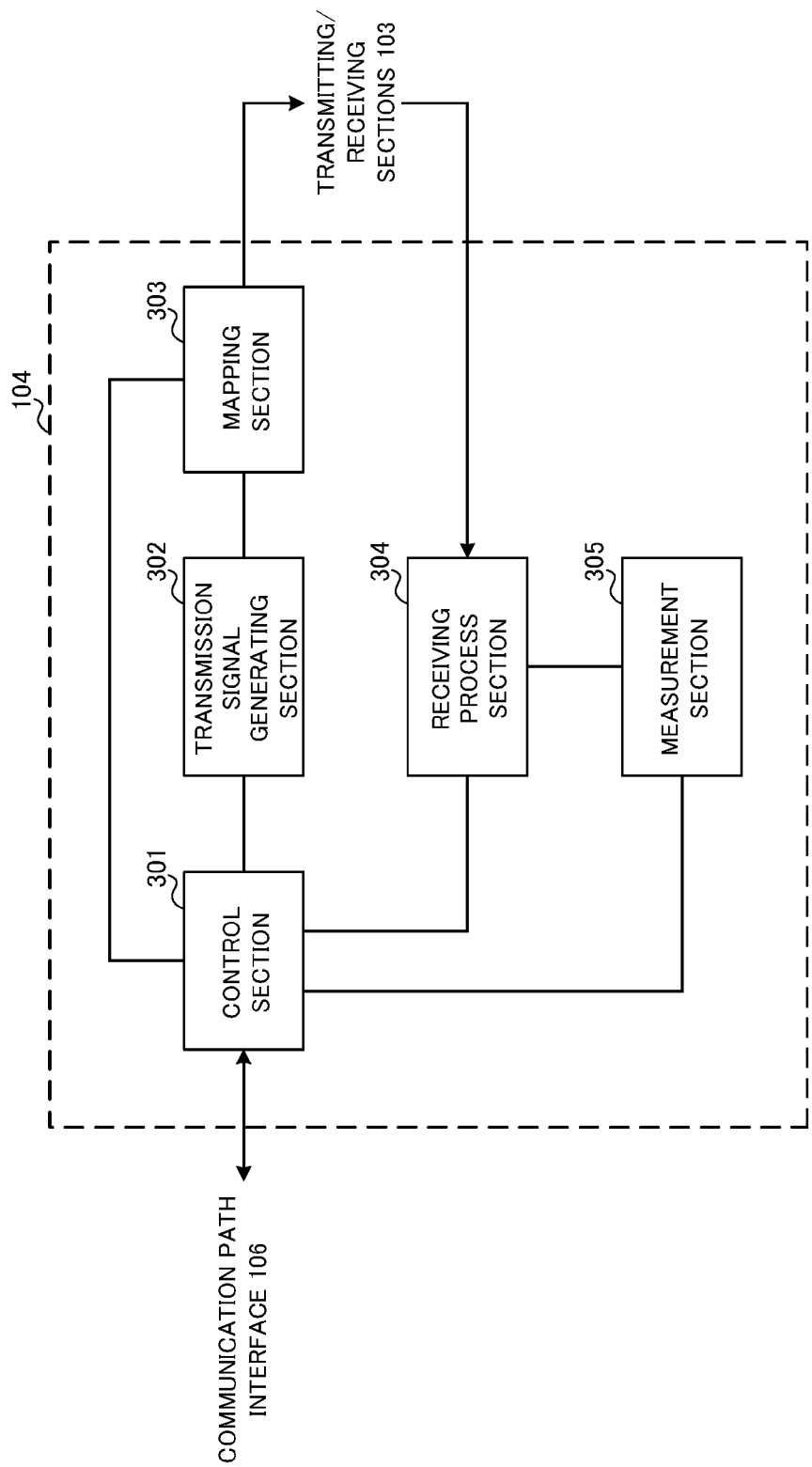
FIG. 10 is a diagram to show an example of a functional structure of a radio base station according to an embodiment of the present invention.

FIG. 10 is a diagram to show an example of a functional structure of a radio base station according to one embodiment of the present invention. Note that, although FIG. 10 primarily shows functional blocks that pertain to characteristic parts of the present embodiment, the radio base station 10 has other functional blocks that are necessary for radio communication as well.

As shown in FIG. 10, the baseband signal processing section 104 provided in the radio base station 10 has a control section (scheduler) 301, a transmission signal generating section 302, a mapping section 303 and a received signal processing section 304.

The control section (scheduler) 301 controls the scheduling of (for example, allocates resources to) downlink data signals that are transmitted in the PDSCH and downlink control signals that are communicated in the PDCCH and/or the enhanced PDCCH (EPDCCH). Also, the control section 301 controls the scheduling of downlink reference signals such as system information, synchronization signals, the CRS (Cell-specific Reference Signal), the CSI-RS (Channel State Information Reference Signal) and so on.

Also, the control section 301 controls the scheduling of uplink reference signals, uplink data signals that are transmitted in the PUSCH, uplink control signals that are transmitted in the PUCCH and/or the PUSCH, RA preambles that are transmitted in the PRACH, and so on. Note that, when a licensed band and an unlicensed band are scheduled with one control section (scheduler) 301, the control section 301 controls communication in the licensed band cells and the unlicensed band cells. For the control section 301, a controller, a control circuit or a control device that can be described based on common understanding of the technical field to which the present invention pertains can be used.

The control section 301 controls the transmission of downlink signals in the transmission signal generating section 302 and the mapping section 303 in accordance with the results of LBT acquired in the measurement section 305. For example, when an LBT result of "free" is input from the measurement section 305, the control section 301 controls the transmission signal generating section 302 and mapping section 303 to start transmitting downlink data from the next subframe.

Based on LBT results acquired in the measurement section 305, the control section 301 may control the transmission signal generating section 302 and the mapping section 303 to transmit channel reservation signals, by using part of radio resource groups, during the period until predetermined downlink signals are transmitted (for example, during the period until the next subframe starts) (the first embodiment and the second embodiment). Also, the control section 301 can control the channel reservation signals to be transmitted by using radio resource groups (transmission resource patterns) that are specific to the operator (system) that runs the radio base station 10 (second embodiment).

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on. For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to radio resources based on commands from the control section 301, and outputs these to the transmitting/receiving sections 103. For the mapping section 303, a mapper, a mapping circuit or a mapping device that can be described based on common understanding of the technical field to which the present invention pertains can be used.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (such as delivery acknowledgement signals (HARQ-ACKs), data signals that are transmitted in the PUSCH, and so on). The received signal processing section 304 outputs the received information to the control section 301. Also, the received signal processing section 304 outputs the received signals, the signals after the receiving processes and so on to the measurement section 305. For the received signal processing section 304, a signal processor/measurer, a signal processing/measurement circuit or a signal processing/measurement device that can be described based on common understanding of the technical field to which the present invention pertains can be used.

The measurement section 305 executes LBT in a carrier where LBT is configured (for example, an unlicensed band) based on commands from the control section 301, and outputs the results of LBT (for example, judgments as to whether the channel state is clear or busy) to the control section 301. Here, the measurement section 305 can execute LBT at arbitrary timings. For example, when the control section 301 judges that there is data to transmit, carrier sensing is performed in accordance with LBE (the first embodiment and the second embodiment).

Also, the measurement section 305 may perform LBT in a plurality of varying lengths of time (the first embodiment). For example, the measurement section 305 may perform LBT at specific timings by using a relatively short length of time. To be more specific, the measurement section 305 may execute LBT at specific timings in carrier sensing durations that are shorter than the carrier sensing durations that are used in other systems (for example, Wi-Fi systems) (the first embodiment).

The measurement section 305 may execute such short-duration carrier sensing by using the time starting immediately before a given subframe (for example, several tens of μs before) and ending at the beginning of this subframe. Also, the measurement section 305 may execute the above short-duration carrier sensing by applying time-shifts in accordance with random timing offsets. Note that it is preferable that the measurement section 305 executes short-duration carrier sensing in synchronization with another radio base station 10 that uses the same unlicensed band in the operator (system) that runs the radio base station 10. That is, it is preferable that radio base stations 10 are synchronized within the same radio communication system.

Note that, when the measurement section 305 executes short-duration carrier sensing in a predetermined cycle, the control section 301 can control the transmission of downlink signals to fulfill the specifications of requirements for FBE LBT, and the transmitting/receiving sections 103 can transmit the downlink signals that are controlled to fulfill these specifications of requirements.

Also, based on information about the patterns of channel reservation signal transmission resources and/or non-transmission resources in the operator (system) that runs the radio base station 10, the measurement section 305 may perform carrier sensing by using these channel reservation signal non-transmission resources (second embodiment). The locations of transmission resources (or non-transmission resources) may be reported from the communication path interface 106, may be determined based on the PLMN ID, operator-specific parameters and so on, or may be configured by OAM.

Also, the measurement section 305 may measure the received power (RSRP) and channel states by using the received signals. Note that the processing results and the measurement results may be output to the control section 301. For the measurement section 305, a measurer, a measurement circuit or a measurement device that can be described based on common understanding of the technical field to which the present invention pertains can be used.

Figure 11:
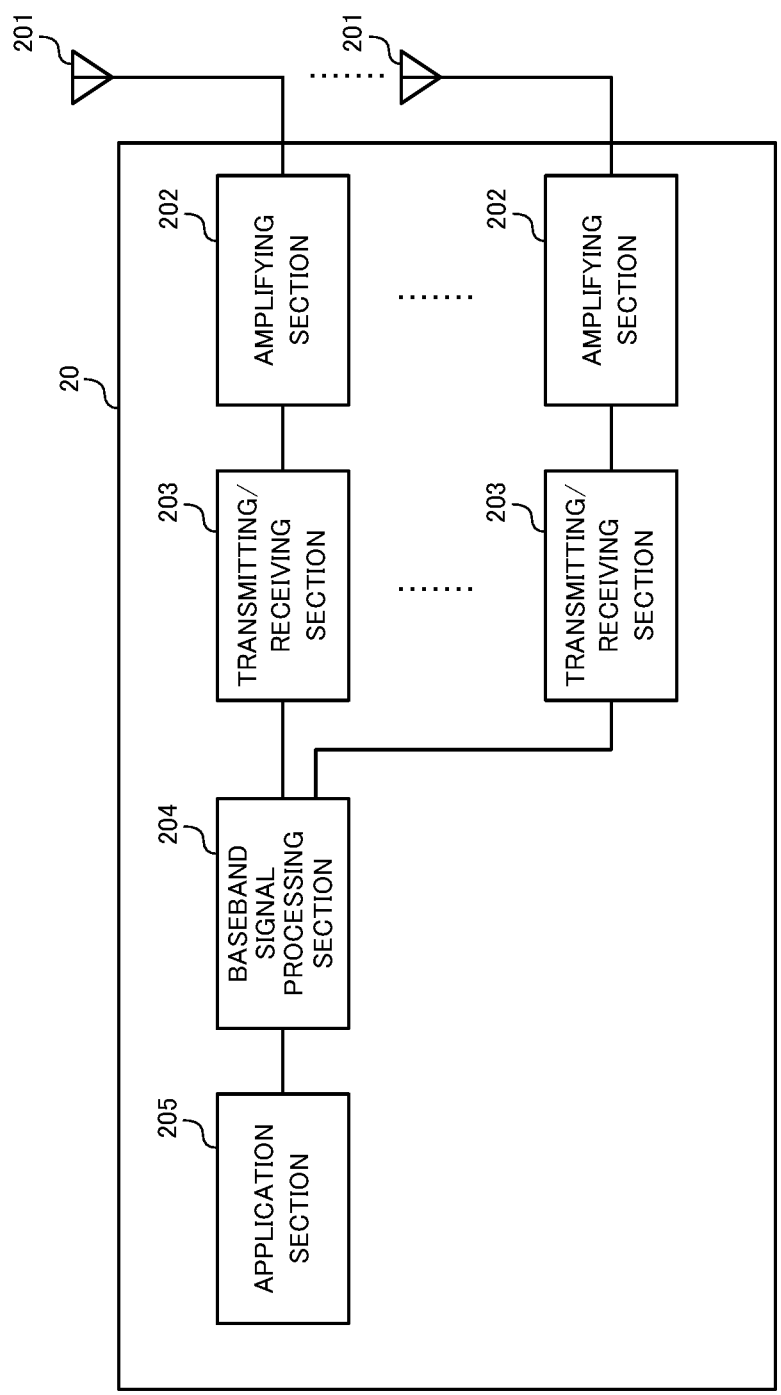
FIG. 11 is a diagram to show an example of an overall structure of a user terminal according to an embodiment of the present invention.

FIG. 11 is a diagram to show an example of an overall structure of a user terminal according to one embodiment of the present invention. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections. Also, although multiple transmitting/receiving antennas 201 are provided here, it is also possible to provide only one.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. For the transmitting/receiving sections 203, transmitters/receivers, transmitting/receiving circuits or transmitting/receiving devices that can be described based on common understanding of the technical field to which the present invention pertains can be used. The transmitting/receiving sections 203 are capable of transmitting/receiving UL/DL signals in unlicensed bands. Note that the transmitting/receiving sections 203 may be capable of transmitting/receiving UL/DL signals in licensed bands as well.

The transmitting/receiving sections 203 receive downlink signals that are transmitted based on the results of LBT executed in the radio base station 10 (the first embodiment and the second embodiment). For example, this LBT is executed in carrier sensing durations that are shorter than the carrier sensing durations used in other systems (for example, Wi-Fi systems) (the first embodiment).

In the baseband signal processing section 204, the baseband signals that are input are subjected to an FFT process, error correction decoding, a retransmission control receiving process, and so on. Downlink user data is forwarded to the application section 205. The application section 205 performs processes related to higher layers above the physical layer and the MAC layer. Furthermore, in the downlink data, the broadcast information is also forwarded to the application section 205.

Meanwhile, uplink user data is input from the application section 205 into the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 12:
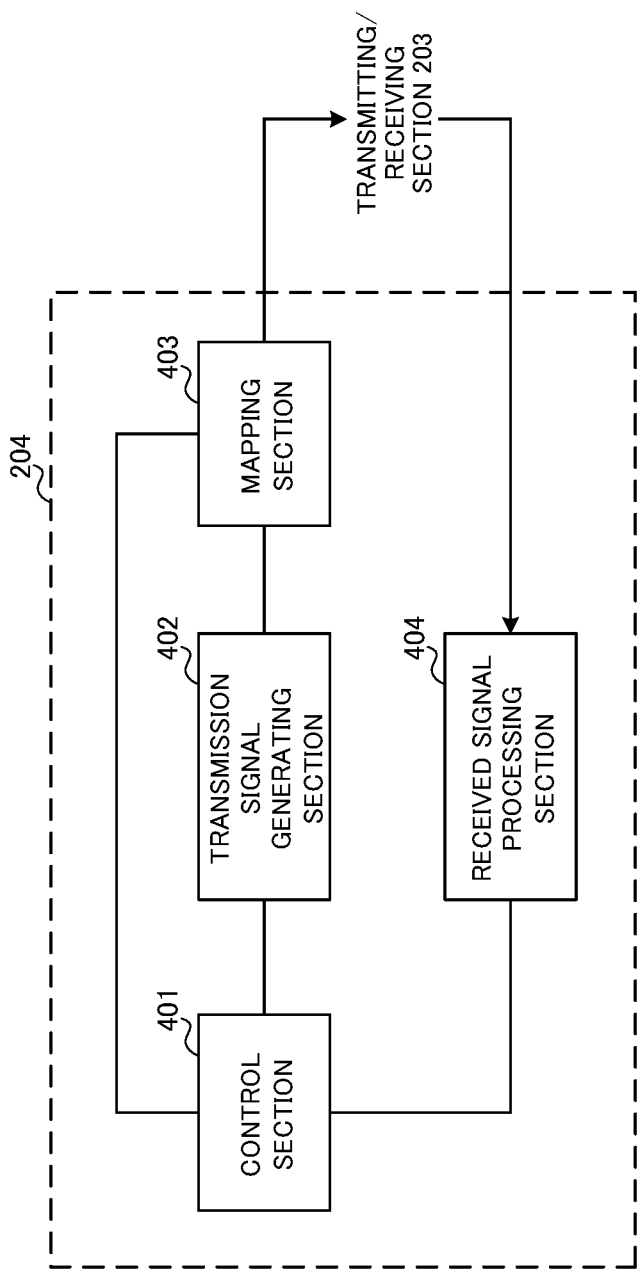
FIG. 12 is a diagram to show an example of a functional structure of a user terminal according to an embodiment of the present invention.

FIG. 12 is a diagram to show an example of a functional structure of a user terminal according to one embodiment of the present invention. Note that, although FIG. 12 primarily shows functional blocks that pertain to characteristic parts of the present embodiment, the user terminal 20 has other functional blocks that are necessary for radio communication as well.

As shown in FIG. 12, the baseband signal processing section 204 provided in the user terminal 20 has a control section 401, a transmission signal generating section 402, a mapping section 403 and a received signal processing section 404.

The control section 401 acquires the downlink control signals (signals transmitted in the PDCCH/EPDCCH) and downlink data signals (signals transmitted in the PDSCH) transmitted from the radio base station 10, from the received signal processing section 404. Here, the control section 401 controls the receiving processes (for example, demapping, demodulation, decoding and so on) in the received signal processing section 404.

For example, when the user terminal 20 learns that the connecting radio base station 10 carries out short-duration carrier sensing, the control section 401 controls the downlink data receiving processes, taking into account the short duration in which this carrier sensing is performed. Note that, when information about short-duration carrier sensing, information about the patterns of channel reservation signal transmission resources and/or non-transmission resources and so on are acquired from the received signal processing section 404, the control section 401 can execute the receiving processes in the received signal processing section 404 based on these.

The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. To be more specific, the control section 401 controls the transmission signal generating section 402 and the mapping section 403. For the control section 401, a controller, a control circuit or a control device that can be described based on common understanding of the technical field to which the present invention pertains can be used.

The transmission signal generating section 402 generates UL signals (uplink control signals, uplink data signals, uplink reference signals and so on) based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of received signals that are input from the transmitting/receiving sections 203. Here, the received signals are, for example, DL signals transmitted from the radio base station 10 (such as downlink control signals, downlink data signals transmitted in the PDSCH, and so on). The received signal processing section 404 outputs the received information to the control section 401. For example, when information about short-duration carrier sensing, information about the patterns of channel reservation signal transmission resources and/or non-transmission resources and so on are acquired from the radio base station 10, the received signal processing section 404 outputs these to the control section 401.

Also, the received signal processing section 404 may measure the received power (RSRP) and channel states by using the received signals. Note that the processing results and the measurement results may be output to the control section 401. For the received signal processing section 404, a signal processor/measurer, a signal processing/measurement circuit or a signal processing/measurement device that can be described based on common understanding of the technical field to which the present invention pertains can be used. The received signal processing section 404 can constitute the receiving section according to the present invention.

Note that the received signal processing section 404 may be configured to start the receiving processes of the (E)PDCCH/PDSCH when a predetermined signal (for example, channel reservation signal) that is transmitted from the radio base station 10 is detected.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or via wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs. That is, radio base stations and user terminals according to one embodiment of the present invention may function as computers that execute the processes of the radio communication method of the present invention.

Here, the processor, the memory and/or others are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network 40 through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes based on these.

Here, the programs have only to be programs that make a computer execute the processes that have been described with the above embodiments. For example, the control section 401 of the user terminals 20 may be stored in the memory and implemented by a control program that operates on the processor, and other functional blocks may be implemented likewise.

Now, although the present invention has been described above in detail, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of the claims. Consequently, the description herein is only provided for the purpose of illustrating examples, and should by no means be construed to limit the present invention in any way.

The disclosures of Japanese Patent Application No. 2015-009815, filed on Jan. 21, 2015 and Japanese Patent Application No. 2015-092110, filed on Apr. 28, 2015, including the specifications, drawings and abstracts, are incorporated herein by reference in their entirety.

The invention claimed is:

1. A radio base station communicating by applying Listen Before Talk (LBT), the radio base station comprising:
   a processor that, in a given carrier, executes listening during a first carrier sensing duration and executes listening at a specific timing during a second carrier sending duration that is shorter than the first carrier sensing duration; and
   a transmitter that transmits a downlink signal based on a listening result,
   wherein the processor executes the listening during the second carrier sensing duration, at the specific timing that comes once transmission of a downlink signal is started,
   the transmitter continues the transmission if the listening result shows that a channel is idle, and stops the transmission otherwise, and
   after a lapse of a given period from starting the transmission of the downlink signal, the transmitter stops the transmission.

2. The radio base station according to claim 1, wherein after the lapse of a given period from starting the transmission of the downlink signal, the transmitter stops the transmission, disregarding the listening result.

3. A radio communication method for a radio base station communicating by applying Listen Before Talk (LBT), the radio communication method comprising:
   in a given carrier, executing listening during a first carrier sensing duration and executing listening at a specific timing during a second carrier sending duration that is shorter than the first carrier sensing duration; and
   transmitting a downlink signal based on a listening result,
   wherein the radio base station executes the listening during the second carrier sensing duration, at the specific timing that comes once transmission of a downlink signal is started,
   the radio base station continues the transmission if the listening result shows that a channel is idle, and stops the transmission otherwise, and
   after a lapse of a given period from starting the transmission of the downlink signal, the radio base station stops the transmission.

* * * * *